United States Patent [19]

Woo et al.

[11] Patent Number: 4,824,699
[45] Date of Patent: Apr. 25, 1989

[54] PROCESS FOR IMPROVED ADHESION TO SEMICRYSTALLINE POLYMER FILM

[75] Inventors: Edward J. Woo, Woodbury; Elaine M. Yorkgitis, Oakdale, both of Minn.

[73] Assignee: Minnesota Mining and Manufacturing Company, St. Paul, Minn.

[21] Appl. No.: 88,069

[22] Filed: Aug. 21, 1987

[51] Int. Cl.$^4$ .......................... B05D 3/10; B32B 31/12
[52] U.S. Cl. .................................. 427/307; 156/83; 427/35; 427/38; 427/39; 427/40; 427/41; 427/54.1; 427/322; 427/385.5
[58] Field of Search .................. 427/307, 322, 385.5, 427/54.1, 55, 38–41, 35; 156/83

[56] References Cited

U.S. PATENT DOCUMENTS

| | | | |
|---|---|---|---|
| 2,511,472 | 6/1950 | Knecik | 427/307 |
| 2,876,187 | 3/1959 | Wolinski | 204/158 |
| 3,081,485 | 3/1963 | Steigerwald | 18/1 |
| 3,337,364 | 8/1967 | Whitbourne | 427/307 |
| 3,574,070 | 4/1971 | Sahely | 427/307 |
| 3,607,354 | 9/1971 | Krogh et al. | 427/307 |
| 3,978,341 | 8/1976 | Hoell | 250/492 |
| 4,414,059 | 11/1983 | Blum et al. | 156/659.1 |
| 4,417,948 | 11/1983 | Mayne-Banton et al. | 156/643 |
| 4,568,632 | 2/1986 | Blum et al. | 430/322 |
| 4,710,563 | 12/1987 | Oetting | 528/501 |

FOREIGN PATENT DOCUMENTS

| | | |
|---|---|---|
| 699915 | 12/1964 | Canada .................... 154/119 |
| 82380 | 4/1984 | Japan . |
| 101937 | 5/1984 | Japan . |
| 101938 | 5/1984 | Japan . |
| 760611 | 11/1956 | United Kingdom . |
| 1579002 | 11/1980 | United Kingdom . |

OTHER PUBLICATIONS

Journal of American Chemical Society, 104, 6784–6785 (1982), Srinivasan and Leigh.
Bishop and Dyer, Applied Physics Letters, 47, 1229 (1985).
Srinivasan and Lazare, Polymer, 26, 1297 (1985) Conference Issue.
Srinivasan, Journal of the Vacuum Society, B1, 923 (1983).
Day and Wiles, Journal of Applied Polymer Science, 16, 175 (1972).
Blais, Day and Wiles, Journal of Applied Polymer Science, 17, p. 1895 (1973).
Mimura et al., Japanese Journal of Applied Physics, 17, 541 (1978).
Lazare and Srinivasan, Journal Physical Chemistry, 90, 2124 (1986).
Kawamura et al., Applied Physics Letters, 40 374 (1982).
Polymer Interface and Adhesion, Souheng Wu, published by Marcel Dekker, Inc., N.Y. and Basel, Chapter 5, p. 206.

Primary Examiner—Janyce Bell
Attorney, Agent, or Firm—Donald M. Sell; Walter N. Kirn; Mark A. Litman

[57] ABSTRACT

The present invention relates to a process for adhering coatings directly to semicrystalline polymer films. The surface of the film is first rendered quasi-amorphous. The quasi-amorphous surface is then either (a) washed with a solvent for amorphous polyester and then coated or (b) coated and heated to a temperature to recrystallize the surface of the polymer. These treatments improve both the consistency and strength of the bond between the coating and the polymer surface.

26 Claims, No Drawings

PROCESS FOR IMPROVED ADHESION TO SEMICRYSTALLINE POLYMER FILM

BACKGROUND OF THE INVENTION

1. Field of the Invention

The present invention relates to the application of coatings to the surface of semicrystalline polymeric films. A process is described for treating at least one surface of the polymer film so as to enhance its ability to bond to coatings applied to that surface.

2. Background of the Art

Some polymeric surfaces have been difficult to use as carrier or barrier layers because they resist adhesion to other materials. This is particularly true of semicrystalline polymers such as polyester, especially poly(ethylene terephthalate). In order to provide articles of certain materials carried on a polyester base, it has been necessary to provide one or more intermediate layers on the polyester before the single desired material can be applied. For example, in the photographic area, polyester substrates are provided with a primer layer (e.g., polymers or copolymers based on polyvinylidene chloride), a thin gelatin layer, and then the silver halide/gelatin photographic emulsion layer is applied to the coated substrate. This is an expensive process, and once the polyester has been coated, it becomes difficult to salvage or recycle any waste material or poorly prepared material.

The effects of actinic radiation on the degradation of polymer surfaces have been studied for many years. Prior to about 1970, this work was done with low intensity photolamps at wavelengths greater than 220 nanometers (nm). Numerous papers are available in the literature, typical of which are Day and Wiles, *Journal of Applied Polymer Science*, 16 175 (1972), and Blais, Day and Wiles, *Journal of Applied Polymer Science*, 17 p. 1895 (1973).

Between 1970 and 1980 the effects on polymer surfaces of ultra-violet (UV) lamps with wavelengths less than 220 nm were studied for lithography and surface modification purposes. Such studies are exemplified by Mimura et al., *Japanese Journal of Applied Physics*, 17 541 (1978). This work illustrates that long exposure times and high energies are required to cause photo-etching when UV lamps are used. U.S. Pat. No. 3,978,341 (Hoell) teaches an apparatus for exposing polymeric contact lenses to a spark discharge producing 83 nm to 133.5 nm U.V. radiation to improve the wettability and adhesiveness of the lenses.

In 1975 the excimer laser was introduced. An excimer laser is an excited dimer laser where two normally non-reactive gases (for example Krypton, Kr, and Fluorine, F2) are exposed to an electrical discharge. One of the gases (Kr) is energized into an excited state (Kr*) in which it can combine with the other gas (F2) to form an excited complex (KrF*). This complex gives off a photon and drops to an unexcited state which, being unstable, immediately disassociates to the original gases (Kr and F2) and the process is repeated. The released photon is the laser output. The uniqueness of the excimer laser is its high efficiency in producing short wavelength (UV) light and its short pulse width. These attributes make the excimer laser useful for industrial applications. Kawamura et al., *Applied Physics Letters*, 40 374 (1982) reported the use of a KrF excimer laser (248 nm wavelengths) to photo-etch polymethyl methacrylate (PMMA), an amorphous polymer used in preparing photolithography resists for semiconductor fabrication.

U.S. Pat. No. 4,414,059 (Blum, Brown and Srinivasan) disclosed a technique for the manufacture of microelectronic devices utilizing ablative photodecomposition of lithography resist amorphous polymers at wavelengths less than 220 nm and power densities sufficient to cause polymer chain fragmentation and immediate escape of the fragmented portions. The photodecomposition leaves an etched surface. The authors found that using an argon/fluorine (ArF) excimer laser emitting at 193 nm with a 12 nanosecond pulse width, a threshold for ablatively photo decomposing poly(methylmethacrylate) resist material occurs at a fluence of about 10–12 mJ/cm$^2$/pulse. It is stated that large amounts of energy, greater than the threshold amount, must be applied before ablation will occur. The energy used must be (1) sufficiently great and (2) applied in a very short amount of time to produce ablative photodecomposition.

U.S. Pat. No. 4,417,948 (Mayne-Banton and Srinivasan) and a related publication, Srinivasan and Leigh, *Journal American Chemical Society*, 104 6784 (1982) teach a method of UV photo etching poly(ethylene terephthalate) (PET). In these publications the authors indicate the mechanism of photo etching to be one of chain scission or bond breaking of surface polymer molecules by the high energy UV. Bond breaking continues in the presence of irradiation and the smaller units continue to absorb radiation and break into still smaller units until the end products vaporize and carry away any excess photon energy. This process results in small particles being ablated away, and various gases being evolved. The remaining surface material comprises molecules of low molecular weight (oligomers). Examining the PET repeating unit and the author'sclaim of bond scission, it is believed that the following occurs:

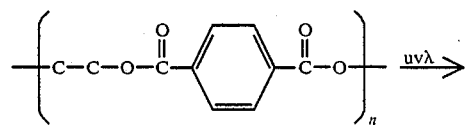

CO, CO$_2$, plus mixture of simple organic compounds and low molecular weight oligomers Indeed, in the *Journal of the American Chemical Society* article, the authors analyze for benzene and start detecting it at about the threshold for photodecomposition for PET; i.e., about 20mJ/cm$^2$/pulse at 193 nm. The authors also indicate that the photo etch process is accelerated in the presence of oxygen which seals the ends of the broken chain's fragments and prevents recombination of these fragments.

Srinivasan, *Journal of the Vacuum Society*, B1, 923 (1983) reports the results of ablative photodecomposition of organic polymers through a 0.048 cm diameter mask and states that a threshold exists for the onset of ablation and, for PMMA, that the threshold is 10mJ/cm$^2$pulse. He then goes on to state that one pulse at 16mJ/cm$^2$ gave an etch mark on PMMA while 50 pulses at 4mJ/cm$^2$/pulse left no detectable etch marks. For PET and polyimide, the threshold began at about 30mJ/cm$^2$/pulse. However, for a satisfactory etch pattern the optimum fluence ranged from 100 to 350 mJ/cm$^2$/pulse.

In Srinivasan and Lazare, *Polymer*, 26, 1297 (1985) Conference Issue, the authors' report the photo etching of 6×12 mm samples of PET, PMMA and polyimide polymers with both continuous radiation at 185 nm from UV lamps and pulsed radiation at 193 nm from an excimer laser. The use of continuous low energy UV lamps caused photo oxidation of the polymer surface with a resultant increased oxygen to carbon ratio (O/C ratio) as determined by X-ray photoelectron spectroscopy (XPS) equipment, while the use of a pulsed high energy excimer laser, which produces chain scission in and ablation of the polymer surface, resulted in a lower O/C ratio as determined by XPS. The authors then go on to say "It may be pointed out that ablative photodecomposition is not exactly a method for the modification of a polymer surface at an atomic level since it totally eliminates the atoms at the surface and creates a fresh surface."

U.S. Pat. No. 4,568,632 (Blum, Holloway and Srinivasan) claims a method for photo etching polyimides. The process described uses a pulsed excimer laser at 193 nm. The stated incident energy required for photo ablation is much higher for polyimide than for PET. The value for the laser fluence threshold of PET was reported as about 30 mJ/cm$^2$/pulse while for polyimide it was reported as about 50 mJ/cm$^2$/pulse. An operative level was noted as about 50-100 mJ/cm$^2$/pulse for PET and 100-300 mJ/cm$^2$/pulse for polyimide. The etch rate found for PET was 1000 Angstroms for a fluence of 100-300 mJ/cm$^2$/pulse and for the polyimide was 750 Angstroms for 350 mJ/cm$^2$/pulse.

Lazare and Srinivasan, *Journal Physical Chemistry*, 90, 2124 (1986) report on the study of surface properties of PET which have been modified by either pulsed UV laser radiation or continuous UV lamp radiation. The authors report on the high fluence ablation of PET as follows: (1) the PET irradiated surface is a layer of low molecular weight material, (2) the surface has a rough chemically homogeneous texture, (3) the surface has a high chemical reactivity characteristic of oligomers, and (4) the surface could be removed by washing in acetone. Since extremely low molecular weight fragments (oligomers) of PET are soluble in acetone, the authors assert this removal of the treated surface is indicative of the presence of low molecular weight material on the surface. The authors also report that the low intensity UV lamp treated PET surfaces would not wash off with acetone. This later article reports thresholds for ablation of PET at about 30–40 mJ/cm$^2$/pulse.

Japanese Patent Publications JA No. 59-82380, JA No. 59-101937 and JA No. 59-101938 (Kitamura, Veno and Nomura) described the treatment of various polymers with many pulses from moderately high energy lasers for the purpose of increasing adhesion and forming a barrier layer to prevent plasticizer migration from within certain polymers.

Bishop and Dyer, *Applied Physics Letters*, 47, 1229 (1985) extended the photoablation etching work of others to actually cutting through or slitting the polymer film by increasing the energy density of the laser beam by focusing techniques.

The authors of the above references were studying the photodecomposition or photoablation process of UV radiation on polymer surfaces, without regard to whether the polymer was semi-crystalline or amorphous. The present invention does not produce substantial photodecomposition and little or no photoablation, and is concerned only with changes in semicrystalline polymer surface layers produced by exposure to an energy regime different from those used in the prior art.

"Polymer Interface and Adhesion", Souheng Wu, published by Marcel Dekker, Inc., N.Y. and Basel, Chapter 5, page 206 indicates that when a polymer melt cools and solidifies, an amorphous surface is usually formed, although its bulk phase may be semicrystalline. This is at least in part a result of the rejection to the surface of fractions or materials which are not readily accommodated in the crystalline structure. This amorphous surface is believed to be extremely thin, corresponding to only a few layers of molecules, is of the order of no more than 2 or 3 nm, and is generally less than 2 nm is thickness.

U.K. Pat. No. 1,579,002 discloses vacuum glow discharge treatment of polymeric surfaces to increase adhesion to that surface. The glow discharge in the vacuum reduces by 75 to 80% the yellowing typically resulting from corona discharge treatment. During glow discharge treatment, the surfaces are heated to a temperature below the glass transition temperature or melting point.

U.S. Pat. 3,081,485 describes a process for heating and softening polymeric materials using e-beam irradiation so that further mechanical treatment such as stretching and coating can be carried out. The energy densities used (e.g., column 2, line 15) are about two orders of magnitude higher than the energy densities used in the present invention. The authors note on column 2, lines 26 ff. that small traces of irradiated material are evaporated during irradiation. Although the patent describes surface heating, the immediate depth of e-beam penetration (see column 3) appears to be greater than 150 microns. This form of energy would have equal effects on the bulk polymer and would not cause only surface modifications.

U.S. Pat. No. 4,631,155 describes the surface modification of polymers by subjecting a surface to at least one pulse of intense electromagnetic radiation. The surface is disoriented during the relatively long exposure to radiation. Disorientation is indicative of an amorphous surface. Very thick amorphous layers appear to be formed as indicated by the chloroform test described in column 5.

U.S. Pat. No. 3,607,354 discloses the use of highly active hydroxybenzene solvents to delustre the surface of an oriented polyethylene terephthalate film. The solvent acts to dissolve and swell the PET and remains in the surface layer. The chemical composition of the surface layer is different from that of the bulk polymer because of the presence of the very active solvents and the apparent formation of large spherulitic crystallites that tend to interfere with light transmission and contribute to the delustering.

SUMMARY OF THE INVENTION

The practice of this invention requires that a quasi-amorphous surface layer of a semicrystalline polymer is treated to improve its adhesion to coatings or laminates. The surface is treated by annealing the surface while in contact with the coating or laminating layer or contacting it with a solvent capable of swelling the amorphous form of the polymer and annealing the surface while in contact with the coating or laminating layer. Such solvents are capable of either dissolving the uppermost layer of the quasiamorphous surface or inducing the recrystallization of the quasi-amorphous surface layer.

The process comprises (1) contacting the quasi-amorphous surface with such a solvent and contacting that surface with a second surface comprising a coating composition or laminable surface, annealing the surface while in contact with said second surface and adhering said quasi-amorphous surface and said second surface, or (2) annealing the surface while in contact with a coating composition or laminable surface (without prior or contemporaneous solvent contact). The quasi-amorphous surface may be contacted with the solvent:

(1) prior to contacting that surface with the coating composition or laminable surface, with or without drying prior to effecting adherence of the two surfaces, and (2) at the same time as contacting the coating composition or laminable layer (e.g., as by having said solvent in said coating composition or on the surface of the laminable surface).

The composite, either before, during, or after completely effecting adherence between the two surfaces preferably should be annealed to insure maximum adherence between said two surfaces. This annealing can be done to some extent (although preferably not completely) before contact is made between said two surfaces to provide improved bonding as compared to conventional polymer surfaces, but is more preferably done after the two surfaces have been contacted. The solvent-contacted quasi-amorphous surface is preferably dried of solvent prior to contact with said second surface. This annealing step is done at such conditions of time and temperature, well known to one of ordinary skill in the art for each semicrystalline polymer, sufficient to thermally recrystallize the surface layer of the semicrystalline polymer.

The nature of and means of obtaining a quasi-amorphous surface layer on a semi-crystalline polymer will be described later. Certain solvents which are useful in the practice of this invention are believed to act on this quasi-amorphous surface layer by removing or partially removing the quasi-amorphous surface layer to expose or partially expose the underlying semi-crystalline polymer surface. It is clear that contact with certain other solvents induces the crystallization of the quasi-amorphous surface layer. In either of these cases, the treatment of the quasi-amorphous surface layer with appropriate solvents provides a semi-crystalline polymer substrate whose surface morphology is ideally suited to receive a wide variety of coatings which upon drying or so-called curing manifest excellent adhesion to that substrate.

In cases where standard or normal drying or curing procedures do not result in sufficient adhesion between the coating and the solvent-treated quasi-amorphous surface layer, this invention provides for a post-coating annealing which is believed to crystallize the quasi-amorphous layer, allowing it to hold fast or lock in the applied coating. In still other cases, the use of post-coating annealing alone is sufficient for obtaining good bonding between the applied coating and the substrate.

Each of these processes is possible only due to the unique character of the quasi-amorphous surface layer.

This process is particularly desirable in the application of organic coatings and laminates, solids-loaded organic coatings and laminates (e.g., magnetic coatings, reflective layers, imageable layers, and pressure-sensitive adhesives) to the surfaces of semicrystalline polymers.

DETAILED DESCRIPTION OF THE INVENTION

The present inventive process first provides a unique amorphized surface layer or surface region on a semi-crystalline polymer, formed by the irradiation of the polymer by radiation which is strongly absorbed by the polymer and of sufficient intensity and fluence to cause such amorphized layer. A coating of material is bonded to said amorphized layer. The semicrystalline polymer surface layer has been altered into a new morphological state by actinic radiation such as an intense short pulse UV excimer laser or short pulse duration, high intensity UV flashlamp. This surface exhibits improved ply adhesion to coatings, either applied form solvent or by heat lamination, as compared to film surfaces treated by corona discharge or plasma priming. The surface is annealed or first contacted or washed with a solvent capable of crystallizing the amorphous form of the polymer and the coatings are applied before, during or after polymer crystallization or the coating is applied and the composite and heated to cause crystallation. Usually the solvent should be applied as at least 0.5 microns, preferably 0.5-100 microns, more preferably 1-10 microns thick on said surfaces. It may be applied by spraying, washing, dipping, brushes, rollers, or the like.

Solvent which are useful in the practice of this invention include all liquids and vapors which can diffuse into and swell the amorphous crystallizable polymer, thereby inducing its crystallization. This solvent-induced crystallization (SINC) requires the polymer to undergo a local depression of its glass transistion temperature, that temperature above which crystallization can occur in a crystallizable polymer. Polymers having glass transition temperatures as low as 0° C. but certainly above room temperature can be melt processed into useful articles, e.g., films, fibers, and molded shapes, and then quenched by rapid cooling to an essentially amorphous state which is stable under ambient conditions for reasonably long periods of time. It is well known that effective swelling agents for these materials promote crystallization of those polymers which are susceptible to crystallization, allowing this crystallization to occur at temperature lower than those normally required for crystallization.

For polyethyleneterephthalate (PET), useful solvents include but are not restricted to acetone, methylethyl ketone (MEK), dimethyl formamide, methylene chloride, chloroform, dibromomethane, benzene, chlorobenzene, nitrobenzene, dioxine, aniline, butyl acetate, and ethyl acetate. Also useful would be mixtures of these or other effective solvents and mixtures of these or other effective solvents with ineffective solvents. Hereinafter, the term "solvent" will be used to denote both pure solvent and solvent mixtures which are effective in inducing crystallization and therefore useful in the practice of this invention. The term "active solvent" may also be used.

Polymers other than PET may be crystallized by solvents provided they (1) have a suitable glass transition temperature, (2) allow diffusion and thus swelling by active solvents, and (3) are crystallizable by virtue of some regularity of structure. A partial but not complete list of potentially useful polymers includes polyacrylonitrile, polybutylene terephthalate, polyamides, polycarbonate, polyvinyl chloride, polyphenylene sulfide, and crystallizable grades of polystyrene, polymethylmethacrylate, and other polyacrylates.

Particularly instructive in the phenomenon of SINC as well as the criteria of choosing active solvents in general and for PET in particular are Desai and Wilkes, Journal of Polymer Science; Symposium No. 46, 291–319 (1974) and Ingamells and Yanumet, British Polymer Journal, 12, 12–18 (1980).

All surface layers which are useful in the practice of the present invention include quasi-amorphous regions. In a preferred embodiment this regions begins at the surface and comprises the entire top surface or region (if discontinuous). In other useful embodiments the quasi-amorphous region may lie immediately below or be part of a highly textured or chemically modified structure as would be produced according to the ablative procedure disclosed in U.S. Pat. No. 4,417,948, "Modification of Polymer Surfaces by Far-ultraviolet Radiation of Low and high (laser) Intensities", R. Srinivasan and S. Lazare, *Polymer*, 1985, Vol. 26, Aug pp. 1297–1300; and "Ablative Photodecomposition", R. Srinivasan and W. J. Leigh, *J. Am. Chem Soc.*, 1982, 104 6784–6785. The useful surfaces according to these references can widely vary in their surface characteristics. These surfaces may contain zones or regions of quasi-amorphous polymer lying underneath polymeric decomposition debris and/or ablated surface areas. All products of this ablation technique will have significant, measurable amounts of polymer decomposition debris on the surface, in concentrations greater than present in the bulk polymer. This debris may be in the form of low molecular weight compounds containing carboxyl groups and hydroxyl groups, lower molecular weight polymers or components, and the like. The polymers subjected to a rigorous ablative process as preferred by these references will have a surface with significant microstructuring thereon having average polymer molecular weights the same or less than that of the polymer in the bulk regions, and the surface exhibiting a lower oxygen/carbon ratio than the bulk material. The periodicity between peaks typically averages between 300 and 4000 nm and the average height (from valley to peak) of the microtexturing features is usually between 200 and 4000 nm. These materials, as well as the preferred structures being substantially free of polymer decomposition debris having quasi-amorphous areas which begin at the surface, are included within the description of a layer having a quasi-amorphous area of at least 5 nm in depth.

The residual debris denoted above would be organic material having a lower oxygen/carbon ration than the bulk polymer. Even if not visually observable in the amounts present, the debris itself would be yellower in color than the bulk material and would be more highly conjugated. The debris also tends to leave microscopically observable (at least 10,000, preferably 20,000×) artifacts on the surface recognizable as debris and not merely texturing. The PET film surfaces shown in these and previously mentioned references of Srinivasan are extremely rough and are so highly degraded that in certain instances significant fractions of the surface layer are soluble in either water or methanol while in all cases the entire surface layer is soluble in acetone. In sharp contrast, the quasi-amorphous surface layer of PET which is key to the practice of this invention is completely insoluble in water and methanol and shows only a minor fraction soluble in acetone. We have found in our case that the only material extracted by acetone consists of the cyclic oligomers of PET, and, in fact, the nature and amount of the acetone-soluble material corresponds to that which acetone extracts from conventional biaxially oriented PET films which have not received any radiation treatment.

In understanding the present invention, a number of terms and concepts should be appreciated. The treatment of the surface of semicrystalline polymeric materials according to the present invention does not add or substantially remove material from the surface. Residual solvent or residual low molecular weight reactants and additives may be volatilized during this treatment, but there is less than 0.1% degradation to a volatile state in the treated polymer volume (to a volatile state) and/or volatilization of the bulk of polymeric material having a molecular weight in excess of 10,000. The chemical modification of the polymer surface (e.g., oxidation, chain breakage) is minimal if there is any at all. Only a small amount of chain breakage occurs, without the generation of significant amounts (i.e., greater than 0.1% by bulk weight) of materials volatilized during the process.

The surface of the semicrystalline polymer is converted into its quasi-amorphous form by heating and rapid cooling of a determined amount of that surface. A determinable depth of the polymer composition is converted to the quasi-amorphous state. The conversion is referred to as "amorphizing." The thickness of the amorphized polymer, as measured from the surface downward into the bulk of the polymer, can be controlled. The polymer usually has a quasi-amorphous top surface having a depth of at least 5 nm, preferably at least 10 nm, more preferably at least 40 nm and most preferably at least 60 nm. The range of thickness for the quasi-amorphous phase or surface of the polymer may be from about 5 to 10,000 nm, preferably 10 to 1,000 nm, more preferably 20 to 500 nm or 20 to 100 nm and most preferably 20 to 250 nm, depending upon the ultimate use of the article.

The terms amorphous, crystalline, semicrystalline, and orientation are commonly used in the description of polymeric materials. The true amorphous state is considered to be a randomly tangled mass of polymer chains. The X-ray diffraction pattern of an amorphous polymer is a diffuse halo indicative of no regularity of the polymer structure. Amorphous polymers show softening behavior at the glass transition temperature, but no true melt or first order transition.

The semicrystalline state of polymers is one in which long segments of the polymer chains appear in both amorphous and crystalline states or phases. The crystalline phase comprises multiple lattices in which the polymer chain assumes an approximately chain-folded conformation in which there is a highly ordered registry in adjacent or nearly adjacent folds of the various chemical moieties of which the chain is constructed. The packing arrangement (short-range order orientation) within the lattice is highly regular in both its chemical and geometric aspects. Semicrystalline polymers show characteristic melting points, above which the crystalline lattices become disordered and lose their identity if given sufficient time. The X-ray diffraction pattern of semicrystalline polymers (or copolymers) generally is distinguished by either concentric rings or a symmetrical array of spots, which are indicative of the nature of the crystalline order.

Orientation of the polymer is the directional alignment of the polymer chain or segments of the polymer chain (long-range order) within the polymer composition. In the quasi-amorphous state described in the practice of the present invention, it appears that the overall long-range order orientation or ordering of the crystallites remains in an approximate crystalline orientation. It also appears that there is, however, significant localized disordering along the chain (short-range order). The quasi-amorphous form thus exhibits the minimal short-range order non-orientation or low orientation typical of amorphous phases while it exhibits long-range ordering typical of crystalline structures. These characteristics are observable and determinable by single analytic techniques or combinations of techniques such as X-ray diffraction, spectromicrophotometry, IRRAS, NMR, solvent extraction, and the like.

The surface quasi-amorphous layer is firmly adhered to the bulk of the semicrystalline polymer because of the in situ nature of the conversion. There can even be a discernible gradation zone between the quasi-amorphous and semicrystalline areas, although this is not always the case. That is, the transition can be very abrupt within the polymer.

The portion of the surface area which is amorphized may be as small as 1% with some beneficial effects being noted. Generally it is at least 3%, and preferably 5 to 100% of the surface. More preferably at least 10, 50 or 80 to 100% of the surface is quasi-amorphous. These are percentages by surface area.

In performing the process of making the quasi-amorphous surfaces of the present invention, the wavelength of the ultraviolet radiation and/or the polymer and/or absorbing dye in the polymer should be chosen so that the polymer composition exhibits an extinction coefficient greater than about 5,000. The higher the extinction coefficient for any given wavelength, the thinner is the surface layer which effectively resides in the optical path of the radiation, and correspondingly, the thinner is the surface layer which undergoes a morphological transition or "amorphization". The wavelength range of preferred interest is between about 180 and 260 nm, with the highest extinction coefficient being manifested at the shorter wavelengths. Preferably a coefficient of extinction of at least 10,000 is exhibited by the polymer at the wavelength of irradiation.

When utilizing ultraviolet radiation (e.g., 193 nm), it is desired that the polyester film receives energy corresponding to a fluence of 3–25 mJ/cm$^2$/pulse. At fluences of less than 3 mJ/cm$^2$/pulse, the effect of the radiation is not readily discerned. At fluences greater than 25 mJ/cm$^2$/pulse, one begins to encounter excessive damage to the affected surface layer, such as vaporization (e.g., off-gassing) of low molecular weight products of photodegradation, substantial reduction of the molecular weight of the surface layer, and more extensive surface roughening.

The radiation pulse duration, i.e., the pulse width, should be in the range of 10 nanoseconds to 100 microseconds to assure rapid excitation of the affected surface layer. Longer pulsewidths tend to be used with lower energy pulses and/or lower coefficients of extinction to produce the appropriate mechanistic events in the formation of the quasi-amorphous regions.

The net effects of pulse width, coefficient of extinction, and radiation intensity is a particular type of mechanistic event. First, and to a minor degree, there is a photolytic effect in which absorbed radiation energy causes random bond scission to occur in the semicrystalline polymer. This effect is desirably minimized in the practice of the present invention to minimize the damage to polymer properties caused by this effect. Indeed, operation of the present invention under ideal conditions has been found to cause some decrease in the oxygen-to-carbon ratio, but sensitive ellipsometric and gravimetric measurements have been unable to detect any significant loss of material as a result of proper radiation conditions. However, the surface layer can undergo some controlled degree of degradation as reflected in less than about a 50% reduction in the number average molecular weight.

The second effect is a result of the unusual nature of the thermal excitation of the surface layer in the optical path of the radiation. Much of the absorbed light energy is translated into heat, with the heating cycle corresponding to the pulse width of the radiation. It is certain that instantaneous temperatures that far exceed the normal melting point of the polymer (e.g., for polyethyleneterephthalate that is about 260° C.) are reached throughout most of the affected volume, although an unusual thermal gradient may be produced in that area because of the rapid attenuation of the incident energy due to light extinction by the polymer composition. The heat cycle thus corresponds to the pulse width, in a range of from about 10 nanoseconds to 100 microseconds. After the heating cycle, the next phenomic concern is the ensuing cooling cycle. Because of the thin nature of the affected volume and its contact with ambient air at the surface and bulk material (which are usually at room temperature), it can be estimated that the surface probably cools down to the glass transition temperature (e.g., for polyethyleneterephthalate this is about 75° C.) within microseconds. Once below this temperature, polymer chain conformations tend to be frozen. Considerations with respect to this unusually brief thermal cycle indicate that conformational changes available to the polymer chains remain highly restricted during the brief period while the affected surface area undergoes this excitation. Short segmental motions, e.g., of the 'crank-shaft' rotational type, have extremely short relaxation times, and it is expected that they may readily occur within the time-temperature regime created in the practice of the process of the present invention. The confirmation that such motions do indeed occur is provided by the IRRAS spectroscopic studies that show that there is a significant trans- to gauche- conformer transformation in the surface layer which results from the irradiation of semicrystalline film (e.g., biaxially oriented poly(ethylene terephthalate)) with an Ar/F excimer laser.

This type of conformational change require the rotation of a short segment of the PET chain involving only a few carbon or oxygen atoms. Similar considerations indicate that it is highly unlikely that the pre-existing crystallites or crystal lattices in the affected surface layer undergo any major spatial rearrangements because this time-temperature regime precludes the type of long range translational and large chain segment rotational motions which would materially change the pre-existing packing arrangement within the crystal lattice. Thus, it strongly appears that the pulsed UV irradiation of PET (and probably all semicrystalline polymers having appropriate extinction coefficients) can, under the guidelines presented here, provide films having surface layers with a unique morphology in which the polymer chains are highly disordered over short segment lengths, but substantially retain the long-range order that existed between chains and over long segment lengths of those chains prior to excitation.

Indeed, the laser treatment of a thin film of thermally crystallized spherulitic PET indicated that the spherulitic structure remained intact, tending to affirm this description.

The substantial trans-to-gauche conformer transformation is a clear indication of short range chain conformation disordering, suggesting that although the crystallites may have undergone short range disordering, the longer range 3-dimensional packing probably remains virtually intact. It is for this reason that the surface is referred to as quasi-amorphous since it has physical characteristics embodying some crystalline properties and yet displays predominantly amorphous properties.

The volume of polymer affected or converted by the process of the present invention (the radiation affected surface layer) is defined as being in a 'quasi-amorphous' state because the highly ordered registry of identical chemical moieties in adjacent or nearly adjacent folds of the chain-folded crystal lattice is largely destroyed, but the overall 3-dimensional architecture of the crystal lattice is largely preserved. Thus, the structural disordering which occurs as a result of the radiation is characteristic of an amorphous state, while the retention of longer range geometric order resembles a pseudo-crystalline state. The layers or regions are neither totally amorphous nor totally crystalline in the classic sense of those words. In this specification where quasi-amorphous layers or regions produced in the practice of the present invention are discussed, those regions may be referred to as quasi-amorphous layers or regions because their chemical properties tend to resemble those of amorphous compositions rather than crystalline compositions, but amorphous and quasi-amorphous are distinctly different as noted in the description of quasi-amorphous materials given above.

The process appears to work by the semicrystalline polymer's absorbing the energy of the irradiation within a limited depth of the irradiated surface. The energy is of sufficient intensity and duration to melt polymer, but of insufficient intensity and duration to evaporate, significantly chemically modify, or ablate polymer. When the irradiation stops, the melted polymer rapidly cools without recrystallization. No special cooling of the melted layer usually needs to be performed as the melted layer is usually sufficiently thin that ambient air and adjacent bulk polyme temperatures will cool it sufficiently rapidly. Forced cooling can be used on thicker layers if desired or can be used on thin layers to insure even more rapid cooling.

The semicrystalline polymer should be able to absorb the irradiation used in the process. The more highly absorptive the polymer is of the radiation, the greater the concentration of the process to the surface of the polymer and the thinner is the quasi-amorphous surface. In general, the polymer should be able to absorb sufficient energy to cause thermal softening or melting of the surface and yet not absorb radiation at such a high level as would cause ablation, excessive degradation, or volatilization of the polymer. For example, a polymer may absorb at least 5% of incident radiation in a 1 micron thick film when the radiation is applied at a rate of 1 Joule/cm$^2$. Absorption of the radiation may be enhanced by the addition of radiation absorbing dyes and pigments to the polymer. These, and other, radiation absorbing materials can have some noticeable effect at levels as low as 0.05% by weight, but can also be used at higher levels, even up to 90% by weight and higher.

For example, a polymer used to modify a pigment may be treated after it has been combined with the pigment. A generally preferred range would be from 0.1 to 50% by weight for such radiation absorbing additives.

The quasi-amorphous surface layer on the semicrystalline polymer base is unique because (1) it exists without substantial change of the surface chemical structure while the bulk properties of the polymer are unchanged, (2) it has a lower softening temperature than the semicrystalline polymer, which lower softening temperature allows auto adhesion at a temperature below that at which the bulk film would autoadhere, (3) it is more easily swelled by organic solvents which allows a high degree of bond entanglement with itself and with other coatings and polymers, (4) the controlled depth of amorphization serves to limit the depth of solvent penetration and hence limits the effect of solvents to the quasi-amorphous layer, and (5) it has a reduced optical index of refraction which is graded from the bulk to the surface.

The substrate intermediate product of the present invention has characteristics and features which tend to be different from those of the products of prior art processes. For example, it has been noted that the depth of the quasi-amorphous areas is at least five (5) nanometers. This tends to be an inherent result of the process. The previously referenced work reported by Wu concerning amorphous surfaces generated by non-crystallizable fractions being forced to the surface produces very thin amorphous layers. The thickness of these layers is never more than 3 nm and is usually less than 2 nm. Additionally, the chemical make-up of the surface region is significantly different from that of the bulk polymer because of the concentration of non-crystallizable fractions at the surface. The surface produced by this prior art phenomenon would have a weight average molecular weight more than 50% different from the weight average molecular weight of the associated bulk semi-crystalline polymer. The surface produced by the practice of the present invention could have a difference of less than 50% between the weight average molecular weight of the surface quasi-amorphous layer and the bulk semicrystalline polymer.

Another characteristic of the treated materials of the present invention which sometimes can be observed but is unique to those articles of the present invention is the similarity between the molecular orientation of the surface quasi-amorphous layer and the semicrystalline polymer in bulk. Polymer orientation relates to the degree to which polymer chains are statistically or more predominantly oriented or aligned within the polymer. Ordinarily, when semicrystalline polymers are melted, the orientation in the amorphous condition is randomized and is significantly different from the orientation in the semicrystalline polymer. Observations of the amorphized surfaces in the practice of the present invention indicate that the orientation within the quasi-amorphous layer remains similar to that of the semicrystalline polymer. Microscopic examination under cross-polarizers shows that the orientation of the quasi-amorphous layer is similar to or indistinguishable by visual observation from the orientation of the semi-crystalline polymer. The physical properties of the quasi-amorphous layer, such as its index of refraction, infrared absorption spectrum, and solubility clearly show that the layer is in fact in an amorphous-like state.

Corona discharge treatment of polymer surfaces does not necessarily render surfaces amorphous, but oxidizes the surface of the polymer. Corona treatment tends to have its most significant oxidative effect to a depth of about 2 nm. The corona treatment creates or adds functional groups to the polymer as a result of reactions with the environment in which the discharging is performed. For example, functional groups such as carboxylic groups, phenol groups, hydroxyl groups, carboxyl groups, and amide groups can be introduced into the polymer by the corona treatment. These groups would not be a direct product of the process of the present invention. Corona treatment of the quasi-amorphous surfaces of the present invention would generate such functional groups and would not necessarily crystallize the surface. Corona treatment also changes the optical density of the surface layer because of the formation of these new chemical eutectics materials in that surface. As compared to the bulk polymer, the optical density of the surface layer may increase by as much as 0.2 within a =nm region of the visible portion of the electromagnetic spectrum (particularly in the yellow region).

Both corona discharge and flame treatment significantly modify the chemical composition of the polymer in the surface regions treated. Corona discharge tends to decompose or under controlled conditions crosslink the polymer, creating a higher crosslink density in the surface than in the bulk polymer. The article of the present invention, unless further treated as by corona discharge, will have approximately the same crosslink density in the amorphous surface layer as in the bulk polymer region. This change in crosslink density can be observed in the surface layer by a reduced tendency or ability to recrystallize. Plasma, and ion implantation treatments have effects on the crosslink density similar to those generated by corona discharge.

Flame treatment of polymeric surfaces (such as that reported in U.S. Pat. No. 4,568,632) is a much more destructive and chemical composition altering process than the process of the present invention. The patent describes the ablation of materials from the surface during treatment. This is probably the combined result of evaporation, oxidation, polymer chain breakage, and other destructive processes. This process would cause the formation of the functional groups described above and probably cause a significant overall change in the molecular weight and chemical make-up of the polymer on the surface, probably to a depth of at least about about 2 nm if not considerably more. The flame treatment as presently practiced also causes a change in the optical density of the polymer on the surface due to the change in the chemical compositon of that surface layer. That change in optical density is at least about 0.2. In the practice of the present invention, the amorphous layer produced on the surface has an optical density which is within 0.1, preferably within 0.08, more preferably within 0.05 and most preferably within 0.03 units of the bulk polymer. Additional treatment (e.g., corona discharge or coloration with dyes or pigments) could, of course, be used to change that value. But in the absence of dyes or pigments differentially distributed between the amorphous layer and the bulk layer, there should be little or no difference in optical densities.

In the preferred fluence range of the present invention, the most notable result is the formation of a new morphological state of the polymer within the surface layer (i.e., a quasi-amorphous, deoriented or oriented glass) which resides in the optical path of the radiation and begins at the surface of the polymer. This morphological transition is attended by some extremely mild degradation (solvent extraction and GPC), as attested by the diminution of the O/C ratio (XPS analysis and solvent extraction data). The failure to detect weight loss by gravimetric and ellipsometric measurements indicates that gas evolution is, at most, a minor event. Similarly, IRRAS spectra shows evidence of only a morphological rather than any chemical change. The change in the O/C ratio is quite different from that occurring with flame treatment or corona discharge where the atom/atom, oxygen/carbon ratio increases. This increase may be very small, but in most thorough treatments there is a change in the ratio of about 0.1 or 0.2.

The remarkable aspects of the surface layer produced in this invention are: (1) its essentially unchanged surface texture; (2) its unchanged optical absorption or scattering characteristics, and (3) its still appreciable molecular weight. Each of these aspects can be very important. For example, film roughness is very injurious in substrates for magnetic media because that roughness can be the limiting factor in the ultimate density of recorded information that can be achieved. Film yellowing or scattering (i.e., haze) on the other hand cannot be tolerated where the film is used as a substrate in the manufacture of imaging products, e.g., X-ray film. Finally, the absence of a major fraction of either low molecular weight or oligomeric products avoids the situation where subsequently applied functional coatings fail in use due to the inherently poor adhesion or solvent resistance which stems from a weak boundary layer present at the coating/film interface.

The quasi-amorphous surface of the polymer also reduces the reflectivity of that surface. Normal, smooth uncoated polymer films will have a reflectivity of 10% or more. Highly texturized polymer surfaces can reduce this reflectivity, but cannot present a smooth surface, that is a surface having no texture which is easily visible with a scanning electron microscope at 10,000× magnification. The polymer films of the present invention can provide smooth surfaces with reflectivities of 9% or less to 550 nm light at 80°–90° incident angles.

The amorphizing portion of the process of the present invention also tends to not modify the surface of the polymer in a topographic morphologic sense. The surface structure, before and after amorphizing, tends to be the same in the practice of the present invention. Surfaces with a high degree of surface roughness may be somewhat softened in their features, but will still tend to have rough surfaces. Smooth surfaces will be substantially unchanged with respect to the absence of features on their surface. Flame treatment would tend to greatly modify the surface features of the surface so treated.

The process of producing this invention is an advance over prior methods of surface modification such as sputter etch, plasma, corona, chemical, flame and solvents alone because no vacuum is required, no contact with the surface is required, no chemistry is added to the treated polymer so that it is more likely to be recyclable, and there are no known environmental problems. These other processes, especially corona discharge treatment of the surface, can be used in combination with the materials of the present invention. Corona discharge of the quasi-amorphous surface can further improve bonding strength.

Polymer generally can be either semicrystalline or amorphous. These categories are descriptions of the degree of ordering of the polymer molecules. Amorphous polymers consist of randomly ordered molecules. That is, the polymers are of low order or are non-ordered and are independently surrounding and intertwined with other molecules. Semicrystalline polymers consist of a complex mixture of amorphous regions and crystalline regions. The crystalline regions are said to be more ordered and the molecules actually pack in some crystalline-like structures. Some crystalline regions may be more ordered than others. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semicrystalline. Some polymers are always amorphous. Some polymers can be made semicrystalline by heat treatments, stretching or orienting and by solvent inducement, and the degree of crystallinity and the nature of orientation can be controlled by these processes.

One aspect of the uniqueness of the present invention is the reversal of the above crystallization process to transform a thin surface layer of semicrystalline polymer into a quasi-amorphous thin surface layer residing on non-affected bulk semicrystalline polymer.

There are two necessary conditions required of the radiation source to provide the treatment of the present invention. Both high intensity (high power per unit area) and high fluence (high energy density per pulse) are required of the radiation source. These requirements assure that a substantial amount of the heat generated in the very thin surface of treatment stays in the surface. The effect of the radiation is to concentrate energy in this surface layer. Thermal diffusion into the bulk reduces this concentration of energy and makes the process less efficient. It is, therefore, desirable that only a small amount of heat be dissipated into the bulk of the polymer during irradiation. The more heat that is transfered to the bulk during the surface irradiation, the less efficient the process becomes until so much heat goes to the bulk that the process no longer works. Because of this requirement to rapidly heat only the surface layer and not the bulk of the polymer, conventional high intensity UV sources such as mercury arc lamps and common Xenon flash lamps with their inherently long pulse widths result in rapid diffusion of the thermal energy into the bulk polymer. This prevents a high concentration of energy being achieved at the surface.

The UV excimer laser is capable of producing high intensity, high fluence radiation on the surface of the polymer to be treated. The polymer used with a UV excimer laser in the practice of this invention must be semicrystalline and UV absorbing at the UV laser wavelengths. The result of the laser pulse interacting with the surface is a combination of photolyzation and heating. In other words, the short intense pulse significantly heats the surface of the polymer, but not the bulk, above the polymer melting temperature, and some surface molecule chain scission occurs. During the brief time the surface region is heated above its melting temperature, the molecules can randomize themselves into a more disordered condition and broken bonds reconnect, although not necessarily to the same end from which they were broken or to the same degree. The temporarily broken molecular bonds will assist this melting process. After irradiation the surface layer will rapidly cool and "freeze" the new more disordered layer into a quasi-amorphous structure. That is, the cooling rate is fast enough so that surface layer cannot recrystallize. The irradiation thus produces a quasi-amorphous layer on the bulk polymer which layer undergoes only a small change in molecular weight because of the recombination of broken bonds or scissions and no chemical changes such as the addition of ions. The surface texture undergoes no significant change because no material has been removed or ablated and both melting and cooling occur over a short period of time.

The laser treated surface can be shown to be quasi-amorphous by a number of tests: (1) it washes off with certain solvents with which only the amorphous form of the polymer may be solubilized swollen or displaced, (2) infrared reflection absorption spectroscopy (IR-RAS) of the surface indicates the same spectrum in the surface layer as is normally exhibited by the amorphous form of the polymer, and (3) thin film ellipsometry of the surface gives the same refractive index as does the amorphous form of the polymer.

XPS measurements of the treated surface indicates no significant chemical changes by addition. It also shows that a small O/C ratio change has occurred which indicates some small amount of surface decarboxylation. Gel permeation chromatography (GPC) shows a relatively small but acceptable molecular weight decrease as compared to the untreated polymer. Water contact angle measurements show a little change in the treated surface which means the surface has not been roughened significantly and that functional groups have not been added. There is a slight texturing on an extremely fine scale. Shadow mask Transmission Electron Microscopy (TEM) indicates peaks and valleys on the surface of about 300 Å.

Early investigations of laser treatments of polymers were concerned with etching or ablation of the polymer and thus used laser intensites and fluences much higher than those required for the present invention. These investigators found a fluence threshold for ablation which of course was different for each polymer treated. Below this threshold no ablation would take place. Investigation was never made to determine what actually was occurring at lower fluences. It has been found that like the fluence threshold for ablation, there is likewise a fluence threshold for the amorphization of this invention and it too varies with the polymer being treated.

Because of its great commercial interest, the treatment of PET has been studied most extensively during the progress of the present invention. However, other polymers have also been studied. The following semicrystalline, UV absorbing polymers or copolymers thereof have been treated: polyesters (e.g., PET), polyamides, polyurethanes, coating mixtures of poly(vinylidene chloride) on PET and poly(vinyl chloride) with UV absorbing plasticizer added. Polypropylene and polyethylene, polyvinyl chloride, polytetrafluoroethylene and polyvinylidene chloride, although semicrystalline are not UV absorbing at wavelengths greater than 190 nm, and therefore, require one of the following: the addition of UV absorbing compounds, shorter wavelength lasers, or an energy source different than a UV laser. E-beam, X-rays, ion beams, and plasmas, if applied in sufficient intensity and fluence can work on these polymers.

The UV radiation source can be excimer laser or flashlamps at wavelengths less than 320 nm. The pulse widths should be less than 100 microseconds. Typical pulse widths are 7.5 microseconds for flash lamps and 10–80 nanoseconds for an excimer laser.

As previously noted, the coated product of the present invention may be made by either of two routes. The first route is to apply a solvent to the quasi-amorphous surface layer of the semicrystalline polymer (as by spraying, wiping, dipping, brushing, or the like) and then subsequently applying the coating material preferably in solution form) to the surface before the quasi-amorphous layer has returned to a crystallized polymer form from the solvent. The applied solvent must be solvent capable of dissolving the crystallizing the true amorphous form of the polymer. The second route is to apply the coating to the quasi-amorphous surface (again preferably from solution) and then treat the composite to a temperature sufficient to allow the quasi-amorphous polymer to recrystallize. The two routes may of course by advantageously combined with both a solvent application and post-coating heating step performed on the composite.

Many different types of coatings may be applied to the semicrystalline polymer's quasi-amorphous surface according to the practice of the present invention. The application of organic coatings is particularly preferred. For example, adhesives (pressure-sensitive solvent-activatable, water activatable, thermally-activatable, and the like) may be coated onto the surface. Active layers such as photographic emulsions (in natural or synthetic hydrophilic colloids), photothermographic emulsions (in polymer binders), magnetic media in polymeric binders, dye/binder layer for optical recording discs, dye layers coated with polymers for optical recording discs, and the like may also be satisfactorily provided in the practice of the present invention.

EXAMPLES

A. Standard preparation and adhesion test of X-ray emulsion coating.

Standard X-ray silver halide emulsion is warmed to 40° C. and coated over the PET film to be tested using a #24 Mayer bar. The emulsion coating is dried at 40° C. for one hour, and part of the cured sample is scribed with a crosshatch pattern using a razor blade. A 3M #610 tape is pressed onto the crosshatched area tightly and pulled off with a vigorous snap. If all of the emulsion remains, the dry adhesion is said to be perfect. Another part of the cured sample is immersed in X-ray developer for two minutes. While still wet with developer, the sample is again scribed with a crosshatch pattern using the corner of a razor blade and rubbed vigorously with a circular motion 24 times with one finger of a rubber-gloved hand. If the emulsion remains intact, the wet adhesion is considered to be perfect.

B. Standard preparation and adhesion test of Dry Silver emulsion coating.

Dry Silver emulsion (in situ halidized silver behenate in polyvinylbutyral, yellow premix, MEK solvent) is coated over the PET sample to be tested using a #22 Mayer bar. The emulsion coating is cured at 82° C. for 5 minutes first, and the film sample is further cured at 137° C. (280° F.) for 10 or 20 seconds. The cured sample is scribed with a crosshatch pattern using an ascriber and template. A 3M #610 tape is pressed tightly onto the crosshatched area and pulled off with a vigorous snap. If all of the emulsion remains intact, the adhesion is considered to be perfect. It is well known that plain PET film provides poor adhesion to both the standard x-ray and dry silver emulsion coatings. Under the standard conditions of sample preparation and adhesive testing, only poor adhesion can be obtained when LT-PET (laser-treated PET) film is coated with X-ray emulsion. The use of the term LT-PET here assumes a quasi-amorphous surface layer. However, the adhesion between LT-PET and the X-ray emulsion is remarkedly improved if one anneals the coated LT-PET following the coating (Example 2), thereby crystallizing the quasi-amorphous layer. Thin post-coating annealing is not as effective if one anneals the LT-PET prior to coating (Example 3–5) because the thermal crystallization of the quasi-amorphous layer prevents sufficient mixing between the substrate and the coating, and the post-coating annealing effectively mechanically bonds a smaller volume of the coating, creating a relatively weak interface.

If one washes LT-PET with active solvents prior to X-ray emulsion coating, the adhesion between the LT-PET and coating is greatly improved. It is instructive to differentiate the actions of solvents such as methylene chloride, which removes or partially removes the quasi-amorphous surface layer of PET, and acetone, which does not remove but crystallizes the quasi-amorphous layer. Example 8 with acetone indicates that the latter type of solvent is most useful while Examples 6 and 7 with methylene chloride and MEK indicate that the former type of solvent, which probably partially crystallizes any residual quasi-amorphous regions, is still quite useful in the practice of this invention.

The present invention contemplates adherence of only one surface with a quasi-amorphous layer and does not contemplate the lamination of two quasi-amorphous surfaces. The present invention includes the adherence to a quasi-amorphous surface of a flowable (liquid or gel) hardenable (driable or polymerizable or crosslinkable) composition or a heat, solvent or pressure laminable layer which does not have a quasi-amorphous surface layer.

TABLE 1

| Sample | Pretreatment (prior to coating) | Dry Adhesion Test Results for X-ray emulsion | | | |
|---|---|---|---|---|---|
| | | Normal condition | Post-coating heat treatment at 100° | | |
| | | | 5 min | 15 min | 30 min |
| 1. Plain PET | No | 0 | 0 | 0 | 0 |
| 2. LT-PET | No | 2–3 | 9 | 10 | 10 |
| 3. LT-PET | Thermal Treatment 100° C./10 min | 2–3 | — | 2–3 | 7 |
| 4. LT-PET | 100° C./15 min | 2–3 | 0 | 2–3 | 6 |
| 5. LT-PET | 100° C./1 hour | 0 | 0 | 0 | 0 |
| 6. LT-PET | Solvent Washed $CH_2Cl_2$ | 6–7 | 10 | — | — |
| 7. LT-PET | MEK | 6–7 | 10 | — | — |

TABLE 1-continued

| | | Dry Adhesion Test Results for X-ray emulsion | | | |
| | Pretreatment | Normal | Post-coating heat treatment at 100° | | |
| Sample | (prior to coating) | condition | 5 min | 15 min | 30 min |
| --- | --- | --- | --- | --- | --- |
| 8. LT-PET | Acetone | 10 | 10 | — | — |

All wet adhesion tests of LT-PET film samples are good except samples 1 and 5.
0 = Complete coating around removal. 10 = Complete coating retention. Intermediate values indicate intermediate degrees of partial removal.

TABLE 2

| Example | Pretreatment (prior to coating) | Adhesion Results for Dry Silver emulsion (MEK) |
| --- | --- | --- |
| 9. Plain PET | No | Poor |
| 10. LT-PET | No | Excellent |
| 11. LT-PET | Solvent Washed CH2Cl2 | Excellent |
| 12. LT-PET | MEK | Excellent |
| 13. LT-PET | Acetone | Excellent |
| 14. LT-PET | Thermal Treatment 100° C./1 hour | Poor |

Only poor adhesion results are obtained when ethyl alcohol is used as coating solution for Dry Silver emulsion.

The data shown in Tables 1 and 2 clearly demonstrate that the combination of good polymeric interfacial mixing and subsequent recrystallization is the key factor in giving excellent adhesion between LT-PET and organic polymeric top coats. It is also important to emphasize that excessive thermal pre-treatment of LT-PET film will destroy good adhesive properties of th LT-PET surface to Dry Silver emulsion coating (MEK). This finding further supports the concept of recrystallization of amorphous LT-PET surfaces as being critical to the improvement of adhesive properties of LT-PET film.

EXAMPLES 15-16

Two sheets of film the same as Example 2 above were coated with two different types of iron oxide-filled dispersions in thermally curable polyurethane resins. The coating solutions contained between 30-40% by weight iron oxide particles/weight of binder. The coating solution contains at least 65-86% of MEK solvent. A number 18 Meyer bar was used to coat the compositions which were then cured at 150° F. (65° C.) for ninety seconds and then aged at room temperature (approximately 18° C.) for seven days. The treated film displayed good adhesive properties towards the magnetic dispersion coatings.

EXAMPLE 17-18

The importance of the annealing or recrystallization step is shown in these Examples. Two samples of polyethyleneterephthalate treated with 193 nm UV radiation to form a quasi-amorphous surface were used. The surfaces of both samples were identically washed with acetone. Both samples were coated with the emulsion used in Examples 1-9. The first sample was annealed for one hour at 40° C. and the second sample was allowed to stand at room temperature (19° C.) for two days. adhesion results during processing while the second sample showed poor adhesion results under the same conditions. This shows the importance of the annealing step.

What is claimed is:

1. A process for coating semicrystalline polymer surfaces which comprises first providing a semicrystalline polymer surface with areas of at least 5 nm in thickness of the same semicrystalline polymer in a quasi-amorphous state and then either:
   (a) applying a solvent capable of swelling or dissolving the amorphous form of said semicrystalline polymer to said surface, heating said surface to a temperature sufficient to enable at least some of said quasi-amorphous areas to recrystallize while a coating or laminable surface is being applied to or is in contact with said polymer surface, and/or
   (b) applying said coating or laminable surface to said surface and subsequently heating said surface to a temperature sufficient to enable at least some of said quasi-amorphous areas to crystallize.

2. The process of claim 1 wherein said quasi-amorphous areas comprise at least 90% of said surface an said heating is done after contacting said quasi-amorphous surface with said coating or laminable surface.

3. The process of claim 1 wherein said polymer is a polyester.

4. The process of claim 2 wherein said polymer is a polyester and said coating is applied after applying and drying said solvent.

5. The process of claim 3 wherein said polyester is polyethyleneterephthalate.

6. The process of claim 4 wherein said polyester is polyethleneterephthalate.

7. The process of claim 1 wherein a coating is applied and said coating is an organic composition applied to said surface with a solvent for said composition which is also a solvent capable of swelling or dissolving the amorphous form of said semicrystalline polymer.

8. The process of claim 2 wherein a coating is applied and said coating is an organic composition applied to said surface with a solvent for said composition which is also a solvent capable of swelling or dissolving the amorphous form of said semicrystalline polymer.

9. The process of claim 5 wherein a coating is applied and said coating is an organic composition applied to said surface with a solvent for said composition which is also a solvent capable of swelling or dissolving the amorphous form of said semicrystalline polymer.

10. The process of claim 6 wherein a coating is applied and said coating is an organic composition applied to said surface with a solvent for said composition which is also a solvent capable of swelling or dissolving the amorphous form of said semicrystalline polymer.

11. A process for coating semicrystalline polymer surfaces which comprises first providing a semicrystalline polymer having on at least one surface thereof areas having thickness of 20 to 50 nm of the same polymer in a quasiamorphous state which has an optical density in the absence of dyes or pigments which differ from that of the semicrystalline form of the polymer by less than 0.1 in the visible regions of the electromagnetic spectrum and then either:
   (a) contacting said surface with a solvent capable of swelling or dissolving the amorphous form of said semicrystalline polymer and subsequently applying a coating to said surface, or (b) applying said coating to said surface and subsequently heating said surface to a temperature sufficient to enable said quasi-amorphous areas to crystallize.

12. The process of claim 11 wherein said quasiamorphous areas comprise at least 90% of said surface.

13. The process of claim 12 wherein said polymer is a polyester.

14. The process of claim 13 wherein said polyester is polyethyleneterephthalate.

15. The process of claim 14 wherein said coating is an organic composition applied to said surface with a solvent for said composition.

16. The process of claim 1 wherein the atom/atom, oxygen/carbon ratio of the quasi-amorphous areas is the same or less than that ratio in the semicrystalline polymer.

17. The process of claim 11 wherein the atom/atom, oxygen/carbon ratio of the quasi-amorphous areas is the same or less than that ratio in the semicrystalline polymer.

18. The process of claim 1 wherein said solvent is acetone.

19. The process of claim 2 wherein said solvent is acetone.

20. The process of claim 11 wherein said solvent is acetone.

21. A process for laminating semicrystalline polymer surfaces which comprises first providing a semicrystalline polymer surface with areas of at least 5 nm in thickness of the same semicrystalline polymer in a quasi-amorphous state and then either:

(a) applying a solvent capable of swelling or dissolving the amorphous form of said semicrystalline polymer to said surface, heating said surface to a temperature sufficient to enable at least some of said quasi-amorphous areas to recrystallize while a laminable surface is being applied to or is in contact with said polymer surface, or (b) applying said laminable surface to said surface and subsequently heating said surface to a temperature sufficient to enable at least some of said quasi-amorphous areas to crystallize.

22. The process of claim 21 wherein said quasi-amorphous areas comprise at least 90% of said surface and said heating is done after contacting said quasiamorphous surface with said laminable surface.

23. The process of claim 1 wherein said polymer is a polyester.

24. The process of claim 22 wherein said polymer is a polyester and said laminable surface is applied after applying and drying said solvent.

25. The process of claim 23 wherein said polyester is polyethyleneterephthalate.

26. The process of claim 24 wherein said polyester is polyethyleneterephthalate.

* * * * *